United States Patent
Emejulu et al.

(10) Patent No.: US 9,866,504 B2
(45) Date of Patent: Jan. 9, 2018

(54) IDENTIFYING END USERS IN NEED OF TECHNICAL ASSISTANCE

(71) Applicant: International Business Machines Corporation, Armonk, NY (US)

(72) Inventors: Nnaemeka I. Emejulu, Austin, TX (US); Ye Liu, Belmont, MA (US); Mario A. Maldari, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 14/690,574

(22) Filed: Apr. 20, 2015

(65) Prior Publication Data

US 2016/0308750 A1 Oct. 20, 2016

(51) Int. Cl.
*H04L 12/58* (2006.01)
*H04L 12/18* (2006.01)
*G06Q 10/06* (2012.01)
*G06F 15/16* (2006.01)
*H04L 29/06* (2006.01)

(52) U.S. Cl.
CPC .......... *H04L 51/04* (2013.01); *G06Q 10/06* (2013.01); *H04L 12/1827* (2013.01); *H04L 65/403* (2013.01)

(58) Field of Classification Search
CPC ..... H04L 51/04; H04L 12/1827; G06Q 10/06; G06Q 10/10
USPC .......................................... 709/206; 715/772
See application file for complete search history.

(56) References Cited

U.S. PATENT DOCUMENTS

| | | | |
|---|---|---|---|
| 8,127,236 B2 * | 2/2012 | Hamilton, II | G06N 5/022 715/706 |
| 8,392,503 B2 | 3/2013 | Kuhlke et al. | |
| 2007/0300174 A1 * | 12/2007 | Macbeth | G06Q 10/10 715/772 |
| 2010/0009331 A1 | 1/2010 | Yaskin et al. | |
| 2010/0064010 A1 | 3/2010 | Alkov et al. | |
| 2012/0310842 A1 * | 12/2012 | Fisher, Jr. | G06Q 10/06 705/304 |

(Continued)

FOREIGN PATENT DOCUMENTS

WO 9825195 A2 6/1998

OTHER PUBLICATIONS

IBM, "Visual feedback system for non visual queues during conference calls," an IP.com Prior Art Database Technical Disclosure, Dec. 21, 2009, p. 1-3, IP.com No. 000191205.

(Continued)

*Primary Examiner* — David Lazaro
*Assistant Examiner* — Zi Ye
(74) *Attorney, Agent, or Firm* — Patricia B. Feighan

(57) ABSTRACT

A method for identifying at least one participant involved in an electronic communication who is in need of technical assistance is provided. The method may include monitoring the electronic communication according to a plurality of predetermined conditions. The method may also include determining if the plurality of predetermined conditions is satisfied. The method may further include identifying the at least one participant who is in need of technical assistance based on the plurality of predetermined conditions being satisfied. The method may also include flagging the identified at least one participant for at least one follow-up action.

18 Claims, 5 Drawing Sheets

(56) References Cited

U.S. PATENT DOCUMENTS

2014/0161416 A1* 6/2014 Chou ...................... H04N 5/91
  386/241

OTHER PUBLICATIONS

Mell et al., "The NIST Definition of Cloud Computing," National Institute of Standards and Technology, Information Technology Laboratory, Oct. 7, 2009, 2 Pages, Version 15.

* cited by examiner

IDENTIFYING END USERS IN NEED OF TECHNICAL ASSISTANCE

BACKGROUND

The present invention relates generally to the field of computers, and more particularly to communication systems.

In an evolving world of constant conference calls and telephonic interaction it can be difficult to identify who on the call is really understanding the discussed subject matter as opposed to those who may need more explanation and clarity. Often, at the end of a call, participants are asked if anyone has any questions. When no one responds to such a question, it may be inferred that the topic has not been fully absorbed.

SUMMARY

According to one embodiment, a method for identifying at least one participant involved in an electronic communication who is in need of technical assistance is provided. The method may include monitoring the electronic communication according to a plurality of predetermined conditions. The method may also include determining if the plurality of predetermined conditions is satisfied. The method may further include identifying the at least one participant who is in need of technical assistance based on the plurality of predetermined conditions being satisfied. The method may also include flagging the identified at least one participant for at least one follow-up action.

According to another embodiment, a computer system for identifying at least one participant involved in an electronic communication who is in need of technical assistance is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include monitoring the electronic communication according to a plurality of predetermined conditions. The method may also include determining if the plurality of predetermined conditions is satisfied. The method may further include identifying the at least one participant who is in need of technical assistance based on the plurality of predetermined conditions being satisfied. The method may also include flagging the identified at least one participant for at least one follow-up action.

According to yet another embodiment, a computer program product for identifying at least one participant involved in an electronic communication who is in need of technical assistance is provided. The computer program product may include one or more computer-readable storage devices and program instructions stored on at least one of the one or more tangible storage devices, the program instructions executable by a processor. The computer program product may include program instructions to monitor the electronic communication according to a plurality of predetermined conditions. The computer program product may also include program instructions to determine if the plurality of predetermined conditions is satisfied. The computer program product may further include program instructions to identify the at least one participant who is in need of technical assistance based on the plurality of predetermined conditions being satisfied. The computer program product may also include program instructions to flag the identified at least one participant for at least one follow-up action.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
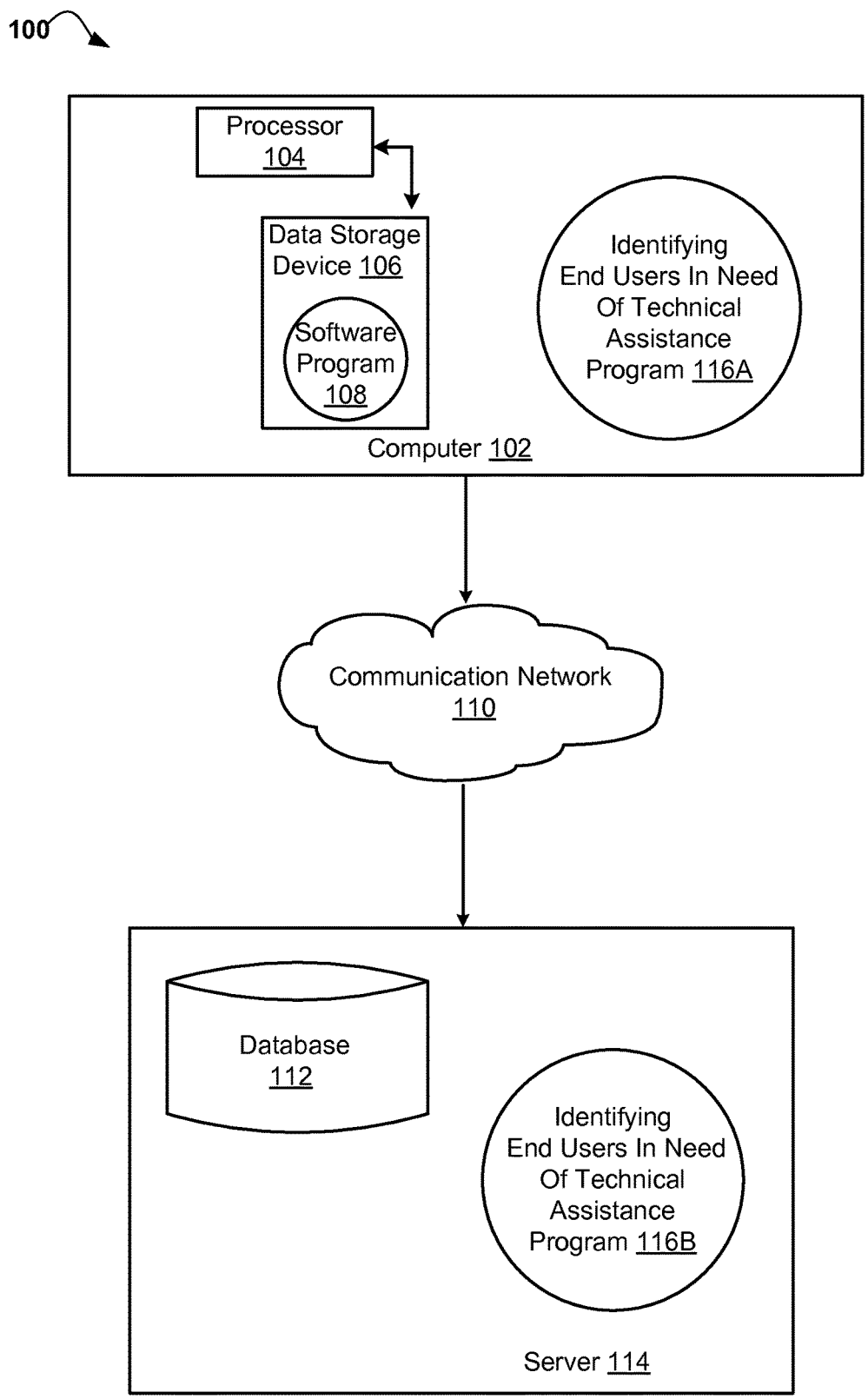
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to communication systems. The following described exemplary embodiments provide a system, method and program product to, among other things, identify end users in need of technical assistance. Therefore, the present embodiment has the capacity to improve the technical field of communication systems by proactively identifying participants (i.e., end users) involved in an electronic communication who are in need of technical assistance. More specifically, the present embodiment may monitor conference calls associated with an electronic communication system (online, telephonic, or video) and automatically identify participants as needing follow-up information. Additionally, the present embodiment may flag the identified participants as needing follow-up information; identify a subject matter expert (SME); and facilitate a follow-up between the flagged participant and the identified SME.

As previously described, participants of a conference call associated with an electronic communication system (video, audio, or online) may often need further information or technical assistance regarding a particular subject matter.

However, it may be difficult to identify who on a conference call or involved in an online communication is really understanding the discussed subject matter as opposed to those who may need more explanation and clarity. As such, it may be advantageous, among other things, to provide an automated way of identifying who on the call or involved in the online communication may be in need of more information, and subsequently pairing them with a subject matter expert. Such a method may be utilized across many disciplines and industries. Additionally, proactive assistance may be used during interactions with customers or clients, providing the presenter with an advantage to identifying participants who may be in need of additional help or information. For example, such a method may assist in a sales or marketing presentation situation or in every day interactions between teams of any industry.

According to at least one implementation, the present embodiment may monitor a telephonic, video, or online (e.g., instant messaging, email, or social networking) conference or communication (including a conversation or a correspondence) by automatically identifying participants of the conference or communication as needing additional information and follow-up on the main topic being discussed on the call. Once flagged as needing follow-up (via the use of key indicators, such as the number of questions asked), a SME may be identified based on subject matter, and a corresponding "reach out" (i.e., follow-up action) would occur to the participant flagged as needing more assistance. The reach out method may include, but is not limited to an auto generated email that opens up a discussion for follow-up; a text message; an instant message; or a manual communication that is initiated by the SME (e.g. a telephone call). As such, the automatic identification of a user needing assistance and the subsequent follow-up from a SME may make follow-up more targeted, efficient, and would take the guess work out of identifying who may need assistance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to identify end users in need of technical assistance. According to at least one implementation, the present embodiment may monitor electronic communications and conference calls (including online, audio, telephonic, or video conversations and correspondence) associated with a communication system to identify a participant that may require further information or assistance. As such, the present embodiment may monitor conference calls associated with a communication system for conditions, such as (1) who is speaking the most; (2) who is speaking the least; and (3) intonation of voice to determine if a question is being asked. If condition number 1 (i.e., who is speaking the most) is met, with characteristics of condition 3 (i.e., intonation of voice to determine if a question is being asked), then the present embodiment may flag the participant for a follow-up action. If condition number 2 (i.e., who is speaking the least) is met with characteristics of condition number 3 (i.e., intonation of voice to determine if a question is being asked), then the present embodiment may flag the participant for a follow-up action. If condition 3 (i.e., intonation of voice to determine if a question is being asked) is met alone, then, the present embodiment may flag the participant for follow-up action.

Once the participants are flagged for a follow-up action, a SME may be identified that would reach out to the participant. The SME match up may be automatically matched by searching a database of names and SME roles. However, in an alternate implementation based on an online personnel directory, a search may be performed on a title or on keyword in the online directory to identify the SME.

Furthermore, according to at least one implementation, the present embodiment may be completely automated. As such, the SME may be automatically identified and a follow-up email, text, or instant message may be sent to the participant reaching out asking if they need more information on the topic. However, regardless of whether the implementation is completely automate or semi-automated, the participants of a conference call can be identified as needing help, and a SME would be contacted and instructed to reach out to the participant with a means of their choosing.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an Identifying End Users In Need Of Technical Assistance program 116A. The networked computer environment 100 may also include a server 114 that is enabled to run an Identifying End Users In Need Of Technical Assistance program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Identifying End Users In Need Of Technical Assistance program 116B running on server computer 114 via the communications network 110. The communications network 110 may include connections, such as wire, wireless communication links, or fiber optic cables. As will be discussed with reference to FIG. 3, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Identifying End Users In Need Of Technical Assistance program 116A, 116B may interact with a database 112 that may be embedded in various storage devices, such as, but not limited to a computer/mobile device 102, a networked server 114, or a cloud storage service.

As previously described, the client computer 102 may access the Identifying End Users In Need Of Technical Assistance program 116B, running on server computer 114 via the communications network 110. For example, a user using a client computer 102 may utilize the Identifying End Users In Need Of Technical Assistance program 116A, 116B to monitor conference calls (including online, telephonic, audio, or video conversations and correspondence) associated with a communication system to identify a participant that may require further information or assistance. The Identifying End Users In Need Of Technical Assistance method is explained in more detail below with respect to FIG. 2.

Figure 2:
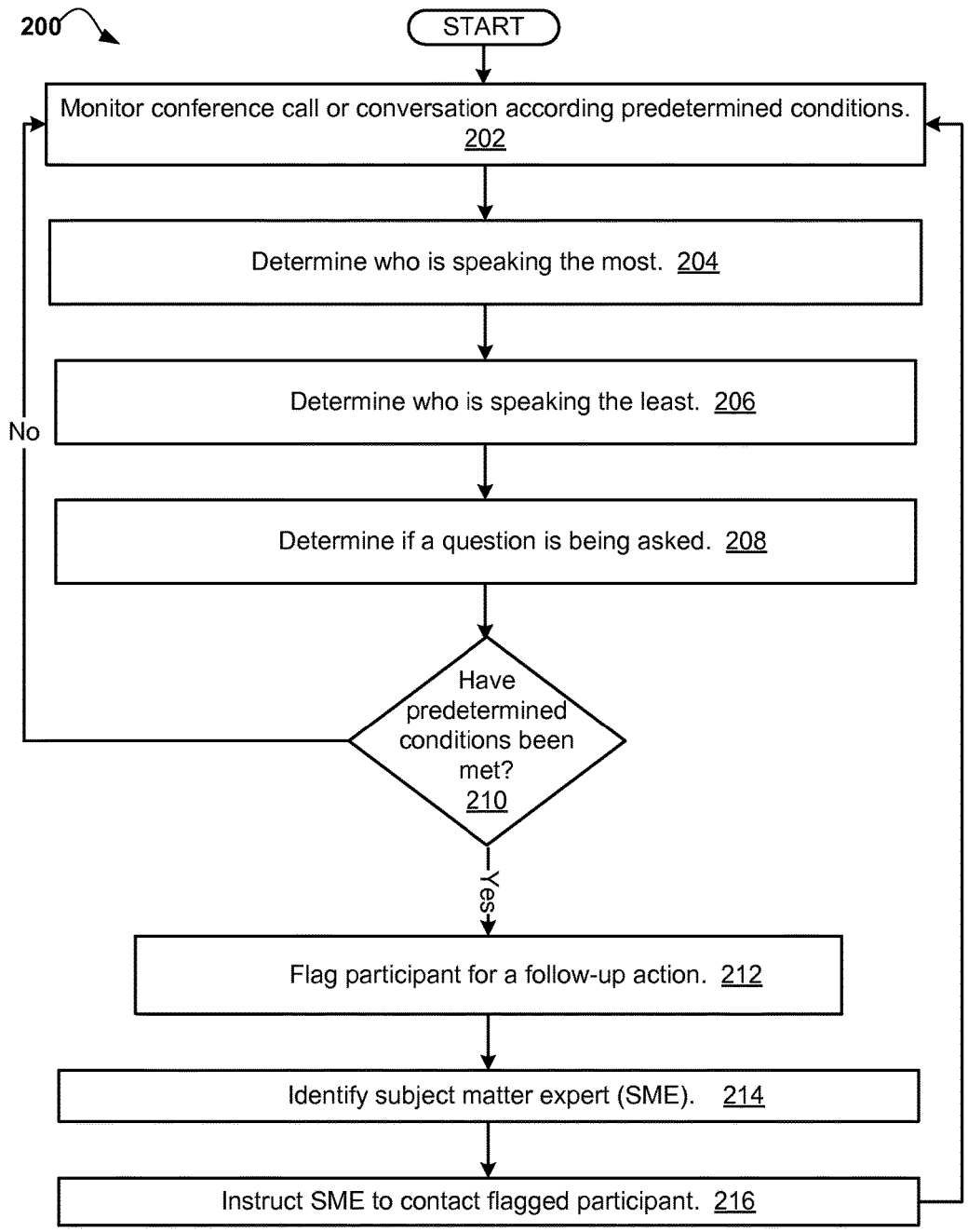
FIG. 2 is an operational flowchart illustrating the steps carried out by a program that identifies end users in need of technical assistance.

Referring now to FIG. 2, an operational flowchart 200 illustrating the steps carried out by a program that identifies end users in need of technical assistance. As previously described, the present embodiment operates in any environment associated with an electronic communication system, such as, but not limited to a telephonic conference call or conversation, a video conference call or conversation, an audio conference call or conversation, or any conversation or correspondence associated with an online communication, such as an instant messaging (IM) service, a short message service (SMS), a blog, a web site, a community, a news feed, an email application, a forum, and a wiki.

Therefore with respect to FIG. 2 at 202, the Identifying End Users In Need Of Technical Assistance program 116A, 116B (FIG. 1) monitors a conference call or conversation (including a correspondence) according to predetermined conditions. According to at least one implementation, the present embodiment may monitor conference calls associated with an electronic communication system according to predetermined conditions (user-determined or pre-programmed), such as (1) who is speaking the most; (2) who is speaking the least; and (3) intonation of voice or context of correspondence to determine if a question is being asked.

Then at 204, the Identifying End Users In Need Of Technical Assistance program 116A, 116B (FIG. 1) determines which participant is speaking the most during the conference call or conversation. For example, with respect to an online conversation, natural language processing (NLP) methods may be used to extract and analyze the content of the conversation to determine which participant is speaking the most. With respect to audio and visual monitoring, techniques, such as vocal inflection and frequency (or infrequency) of participants speaking may be utilized to identify a participant that may be flagged as needing technical follow-up or additional support.

Then at 206, the Identifying End Users In Need Of Technical Assistance program 116A, 116B (FIG. 1) determines which participant is speaking the least during the conference call or conversation. As previously described, natural language processing (NLP) methods may be used to extract and analyze the content of the online conversation to determine which participant is speaking the least. With respect to audio and visual monitoring, techniques, such as vocal inflection and frequency (or infrequency) of participants speaking may be utilized to identify a participant that may be flagged as needing technical follow-up or additional support.

Next at 208, the Identifying End Users In Need Of Technical Assistance program 116A, 116B (FIG. 1) determines if a question is being asked according to intonation of voice (for audio communication) or context of a correspondence (e.g., by extracting the elements of the conversation and analyzing the content by natural language processing (NLP) methods).

Then at 210, the Identifying End Users In Need Of Technical Assistance program 116A, 116B (FIG. 1) determines whether the pre-determined conditions have been met. For example, according to at least one implementation, the present embodiment may determine if condition number (1) (e.g., who is speaking the most) is met, with characteristics of condition (3) (e.g., intonation of voice to determine if a question is being asked), then the present embodiment may continue to step 212 to flag the participant for a follow-up action.

Furthermore, if condition number (2) (e.g., who is speaking the least) is met with characteristics of condition number (3) (e.g., intonation of voice to determine if a question is being asked), then the present embodiment may also flag the participant for a follow-up action. Additionally, if condition (3) (e.g., intonation of voice to determine if a question is being asked) is met alone, then, the present embodiment may also flag the participant for follow-up action.

If at 210 it is determined that the pre-determined conditions have not been met, then the method will continue to monitor conference call or conversation at 202. However, if at 210 it is determined that the pre-determined conditions have been met, then the method continues to step 212 where the identified participant is flagged for follow-up action.

Then at 214, a subject matter expert (SME) is identified. Therefore, according to at least one implementation, once a participant is flagged for a follow-up action, a SME may be identified that would reach out to the participant. The SME match up may be automatically matched by searching a database, such as database 112 (FIG. 1) of names and SME roles. However, in an alternate implementation based on an online personnel directory, a search may be performed on a title or on keyword in the online directory to identify the SME. According to at least one implementation, the SME may be automatically identified and a follow-up email, text, or instant message may be sent to the participant reaching out asking if they need more information on the topic.

Next at 216, the SME is instructed to contact the flagged participant and the method may return to previously described step 202 to continue to monitor the conference call or conversation. According to at least one implementation, the SME may be automatically identified and a follow-up email, text, or instant message may be sent to the participant reaching out asking if they need more information on the topic. However, regardless of whether the implementation is completely automate or semi-automated, the participants of a conference call can be identified as needing help, and a SME would be contacted and instructed to reach out to the participant with a means of their choosing.

It may be appreciated that FIG. 2 provides only an illustration of one implementation and does not imply any limitations with regard to how different embodiments may be implemented. Many modifications to the depicted environments may be made based on design and implementation requirements. For example, as previously described, the Identifying End Users In Need Of Technical Assistance program 116A, 116B (FIG. 1) may be completely automated. As such, the SME may be automatically identified and a follow-up email, text, or instant message may be sent to the participant reaching out asking if they need more information on the topic. The present embodiment may perform real-time analysis that is focused on the interactions between participants of a conference call or conversation. As such, the present embodiment may monitor interaction between participants using techniques, such as, but not limited to, conversation monitoring, inflection of voice or tone, and frequency (or infrequency) of speaking to determine if a participant may need follow-up or additional technical assistance and therefore, automatically match them with a SME.

Furthermore, the follow-up method is customizable and may be predetermined by the user or pre-programmed according to various criteria, such as cultural reference and demographic consideration. For example, cultural distinctions may be considered from the perspective of frequency of communication (i.e., not speaking may indicate an acceptance of an idea or lack of understanding based on a cultural reference).

Additionally, with respect to the consideration of the aspect of cultural reference and demographic considerations, the various criteria of the present embodiment may be customizable so that it may consider where it is being used and the target audience. For example, in some cultures, lack of speaking may indicate a cultural sensitivity to avoid being rude by interrupting the speaker. As such, in this case, the lack of speaking of an individual may not be an indicator of needing help. Therefore, in this case, the present embodiment may rely on frequency of speaking as well as inflection of voice (indicating how many questions are being asked). Such a customizable configuration option will allow for the present embodiment to span cultural boundaries and demographic considerations.

Figure 3:
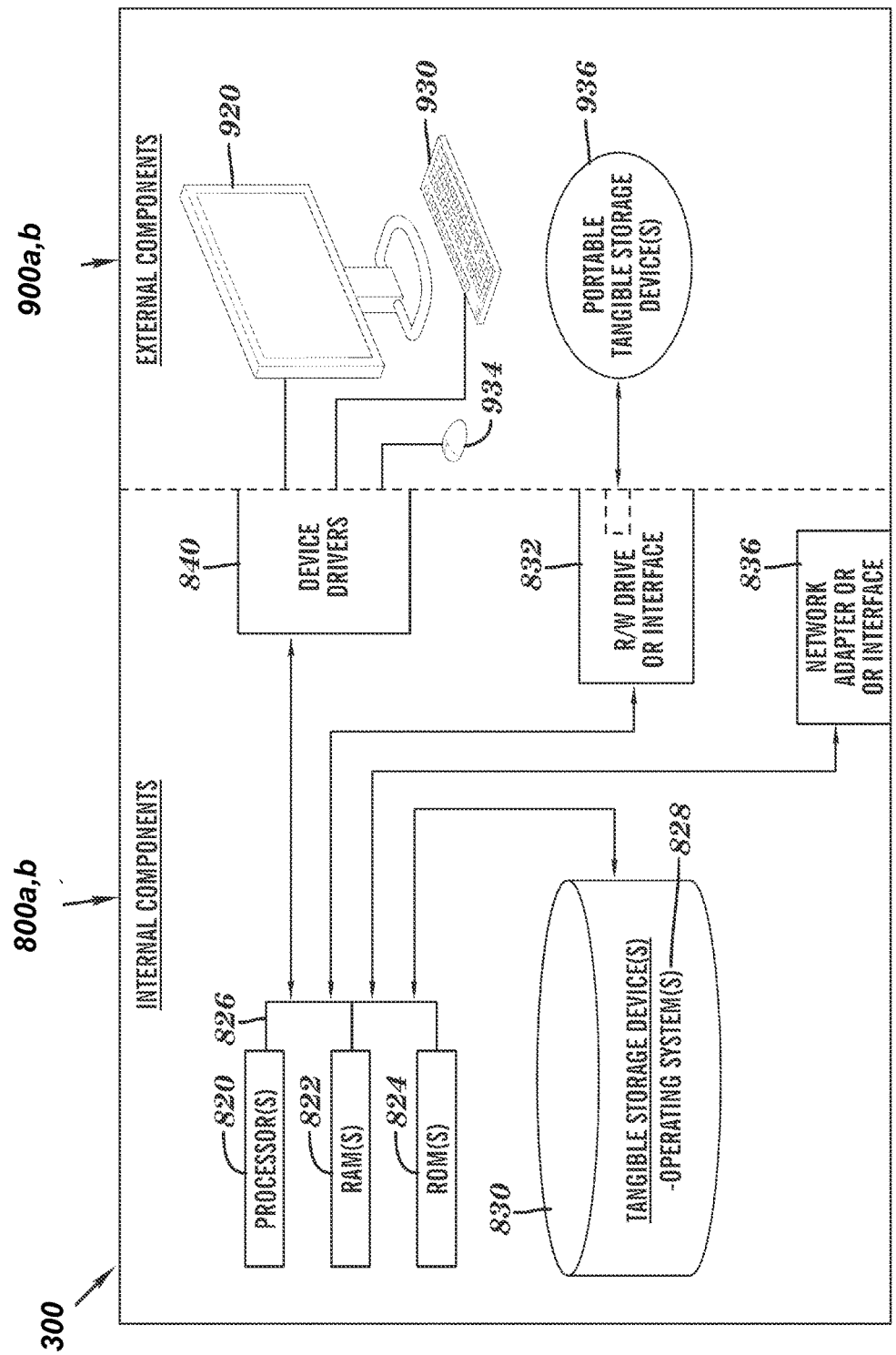
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 3. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Identifying End Users In Need Of Technical Assistance program 116A (FIG. 1) in client computer 102 (FIG. 1) and the Identifying End Users In Need Of Technical Assistance program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Identifying End Users In Need Of Technical Assistance program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Identifying End Users In Need Of Technical Assistance program 116A (FIG. 1) in client computer 102 (FIG. 1) and the Identifying End Users In Need Of Technical Assistance program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Identifying End Users In Need Of Technical Assistance program 116A (FIG. 1) in client computer 102 (FIG. 1) and the Identifying End Users In Need Of Technical Assistance program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices. Each of the sets of internal components 800 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
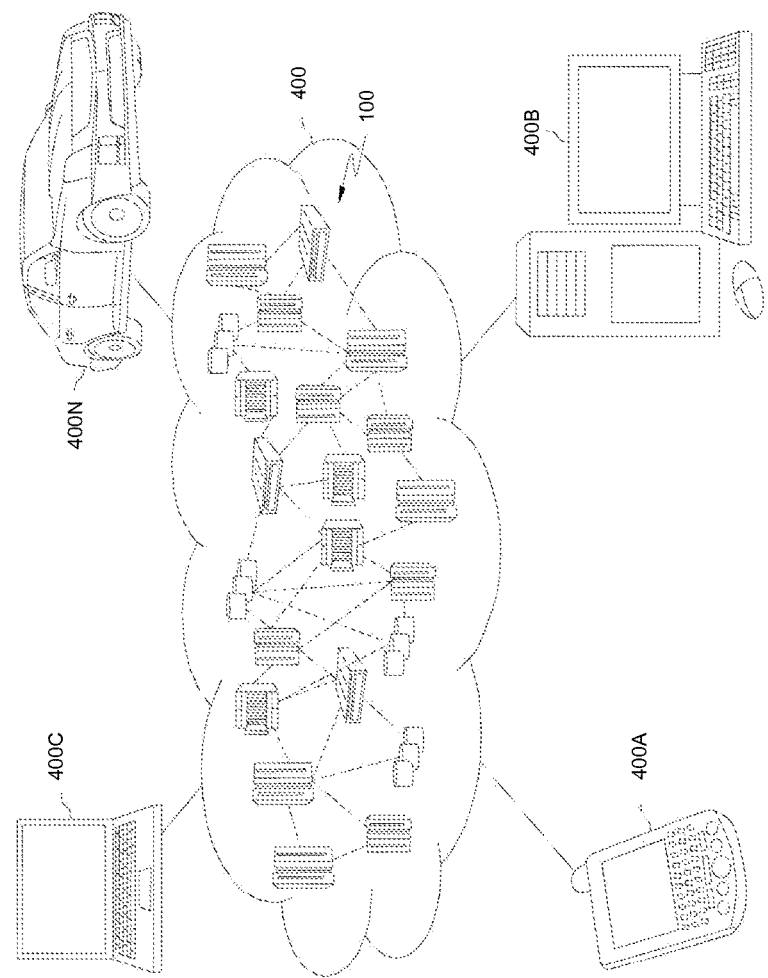
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
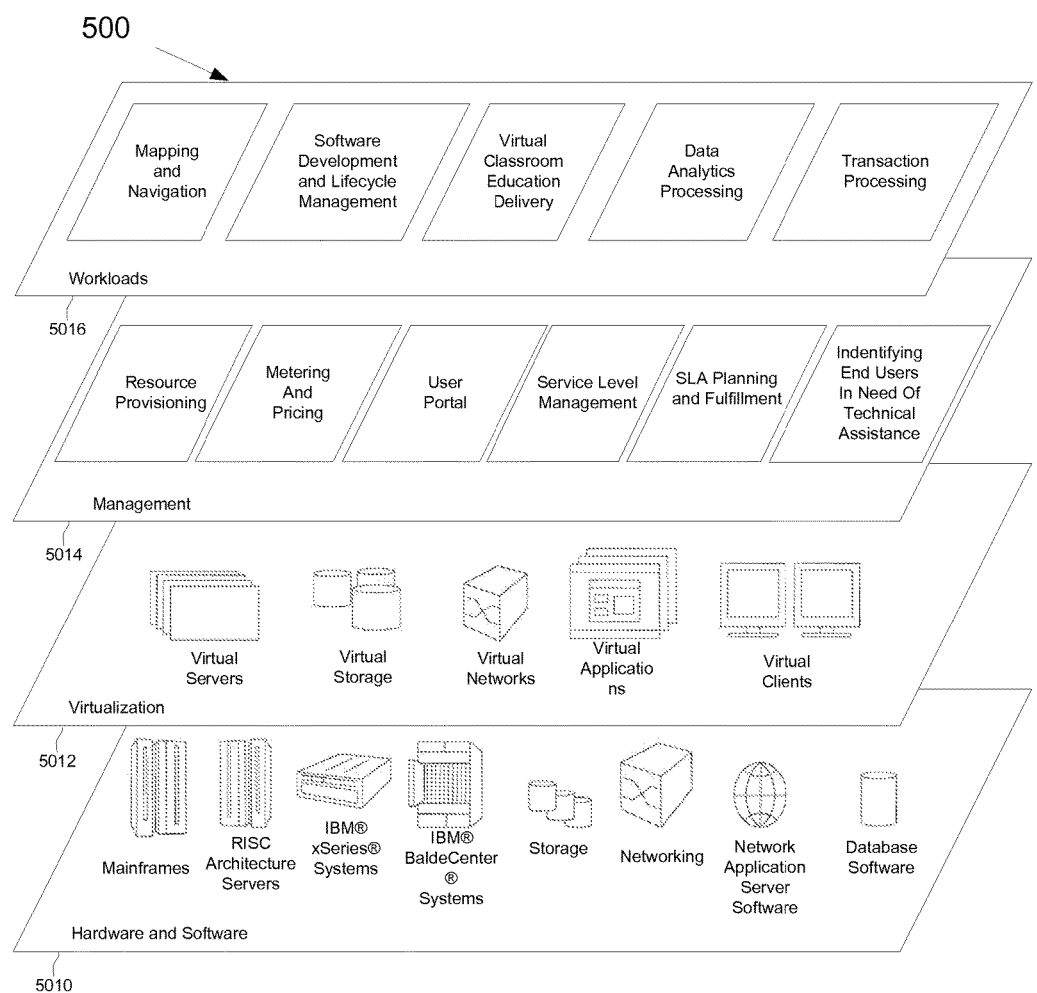
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 5010 includes hardware and software components. Examples of hardware components include: mainframes; RISC (Reduced Instruction Set Computer) architecture based servers; storage devices; networks and networking components. In some embodiments, software components include network application server software.

Virtualization layer 5012 provides an abstraction layer from which the following examples of virtual entities may be provided: virtual servers; virtual storage; virtual networks, including virtual private networks; virtual applications and operating systems; and virtual clients.

In one example, management layer 5014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. An Identifying End Users In Need Of Technical Assistance program may monitor conference calls associated with a communication system (online, telephonic, audio, or video) and automatically identify participants as needing follow-up information. Additionally, the present embodiment may flag participants as needing follow-up information; identify a subject matter expert (SME); and facilitate a follow-up between the flagged and the identified SME.

Workloads layer 5016 provides examples of functionality for which the cloud computing environment may be utilized.

Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying at least one participant involved in an electronic communication who is in need of technical assistance, the method comprising:
   monitoring the electronic communication according to a plurality of predetermined conditions;
   determining if the plurality of predetermined conditions is satisfied, wherein the plurality of predetermined conditions include identifying a participant who is speaking the most, identifying a participant who is speaking the least, and identifying an intonation of voice of a participant to determine if a question is being asked;
   determining if the identified intonation of voice is associated with the identified participant who is speaking the most or the identified participant who is speaking the least;
   in response to determining the identified intonation of voice is associated with the identified participant who is speaking the most, identifying the at least one participant who is in need of technical assistance;
   in response to determining the identified intonation of voice is associated with the identified participant who is speaking the least and determining that a cultural sensitivity is not present, identifying the at least one participant who is in need of technical assistance;
   flagging the identified at least one participant for at least one follow-up action;
   simultaneously searching an online personnel directory and an online database of subject matter expert (SME) roles and names;
   matching a topic associated with the electronic communication with at least one searched SME role;
   in response to matching the topic associated with the electronic communication to the at least one searched SME role, identifying a name associated with the matched SME role and identifying a title associated with the identified name, wherein the identified name is stored in the searched online database and the identified title is stored in the searched online personnel directory; and
   automatically generating an email from the identified name to the identified at least one participant, wherein the automatically generated email proactively assists the identified at least one participant by automatically initiating a follow-up discussion associated with the monitored electronic communication.

2. The method of claim 1, further comprising:
   identifying at least one subject matter expert (SME); and
   performing at least one action to facilitate the at least one follow-up with the identified participant, wherein the facilitated follow-up is between the identified at least one participant and the identified at least one SME.

3. The method of claim 1, wherein the SME is selected based on a subject matter associated with the electronic communication.

4. The method of claim 1, wherein the at least one performed action to facilitate the at least one follow-up between the identified at least one participant and the identified at least one SME includes at least one of an auto generated email that opens up a discussion for the follow-up; a text message; an instant message; or a manual communication that is initiated by the identified at least one SME.

5. The method of claim 1, wherein the electronic communication is associated with an electronic communication system and comprises at least one of a telephonic conference call or a telephonic conversation; a video conference call or a video conversation; an audio conference call or an audio conversation; and a conversation or a correspondence associated with an online communication.

6. The method of claim 5, wherein the online communication comprises a communication associated with at least one of an instant messaging (IM) service, a short message service (SMS), a blog, a web site, a community, a news feed, an email application, a forum, and a wiki.

7. The method of claim 1, wherein the plurality of predetermined conditions is customizable and is either user-determined or pre-programmed.

8. A computer system for identifying at least one participant involved in an electronic communication who is in need of technical assistance, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   monitoring the electronic communication according to a plurality of predetermined conditions;
   determining if the plurality of predetermined conditions is satisfied, wherein the plurality of predetermined conditions include identifying a participant who is speaking the most, identifying a participant who is speaking the least, and identifying an intonation of voice of a participant to determine if a question is being asked;
   determining if the identified intonation of voice is associated with the identified participant who is speaking the most or the identified participant who is speaking the least;
   in response to determining the identified intonation of voice is associated with the identified participant who is speaking the most, identifying the at least one participant who is in need of technical assistance; and
   in response to determining the identified intonation of voice is associated with the identified participant who is speaking the least and determining that a cultural sensitivity is not present, identifying the at least one participant who is in need of technical assistance;
   flagging the identified at least one participant for at least one follow-up action;
   simultaneously searching an online personnel directory and an online database of subject matter expert (SME) roles and names;
   matching a topic associated with the electronic communication with at least one searched SME role;

in response to matching the topic associated with the electronic communication to the at least one searched SME role, identifying a name associated with the matched SME role and identifying a title associated with the identified name, wherein the identified name is stored in the searched online database and the identified title is stored in the searched online personnel directory; and automatically generating an email from the identified name to the identified at least one participant, wherein the automatically generated email proactively assists the identified at least one participant by automatically initiating a follow-up discussion associated with the monitored electronic communication.

9. The computer system of claim 8, further comprising: identifying at least one subject matter expert (SME); and performing at least one action to facilitate the at least one follow-up with the identified participant, wherein the facilitated follow-up is between the identified at least one participant and the identified at least one SME.

10. The computer system of claim 8, wherein the SME is selected based on a subject matter associated with the electronic communication.

11. The computer system of claim 8, wherein the at least one performed action to facilitate the at least one follow-up between the identified at least one participant and the identified at least one SME includes at least one of an auto generated email that opens up a discussion for the follow-up; a text message; an instant message; or a manual communication that is initiated by the identified at least one SME.

12. The computer system of claim 8, wherein the electronic communication is associated with an electronic communication system and comprises at least one of a telephonic conference call or a telephonic conversation; a video conference call or a video conversation; an audio conference call or an audio conversation; and a conversation or a correspondence associated with an online communication.

13. The computer system of claim 12, wherein the online communication comprises a communication associated with at least one of an instant messaging (IM) service, a short message service (SMS), a blog, a web site, a community, a news feed, an email application, a forum, and a wiki.

14. The computer system of claim 8, wherein the plurality of predetermined conditions is customizable and is either user-determined or pre-programmed.

15. A computer program product for identifying at least one participant involved in an electronic communication who is in need of technical assistance, the computer program product comprising:

one or more computer-readable storage devices and program instructions stored on at least one of the one or more tangible storage devices, the program instructions executable by a processor, the program instructions comprising:

program instructions to monitor the electronic communication according to a plurality of predetermined conditions;

program instructions to determine if the plurality of predetermined conditions is satisfied, wherein the plurality of predetermined conditions include identifying a participant who is speaking the most, identifying a participant who is speaking the least, and identifying an intonation of voice of a participant to determine if a question is being asked;

program instructions to determine if the identified intonation of voice is associated with the identified participant who is speaking the most or the identified participant who is speaking the least;

in response to determining the identified intonation of voice is associated with the identified participant who is speaking the most, program instructions to identify the at least one participant who is in need of technical assistance;

in response to determining the identified intonation of voice is associated with the identified participant who is speaking the least and determining that a cultural sensitivity is not present, program instructions to identify the at least one participant who is in need of technical assistance;

program instructions to flag the identified at least one participant for at least one follow-up action;

program instructions to simultaneously search an online personnel directory and an online database of subject matter expert (SME) roles and names;

program instructions to match a topic associated with the electronic communication with at least one searched SME role;

in response to matching the topic associated with the electronic communication to the at least one searched SME role, program instructions to identify a name associated with the matched SME role and identifying a title associated with the identified name, wherein the identified name is stored in the searched online database and the identified title is stored in the searched online personnel directory; and program instructions to automatically generate an email from the identified name to the identified at least one participant, wherein the automatically generated email proactively assists the identified at least one participant by automatically initiating a follow-up discussion associated with the monitored electronic communication.

16. The computer program product of claim 15, further comprising:

program instructions to identify at least one subject matter expert (SME); and program instructions to perform at least one action to facilitate the at least one follow-up with the identified participant, wherein the facilitated follow-up is between the identified at least one participant and the identified at least one SME.

17. The computer program product of claim 15, wherein the SME is selected based on a subject matter associated with the electronic communication.

18. The computer program product of claim 15, wherein the at least one performed action to facilitate the at least one follow-up between the identified at least one participant and the identified at least one SME includes at least one of an auto generated email that opens up a discussion for the follow-up; a text message; an instant message; or a manual communication that is initiated by the identified at least one SME.

* * * * *